United States Patent Office 2,810,674
Patented Oct. 22, 1957

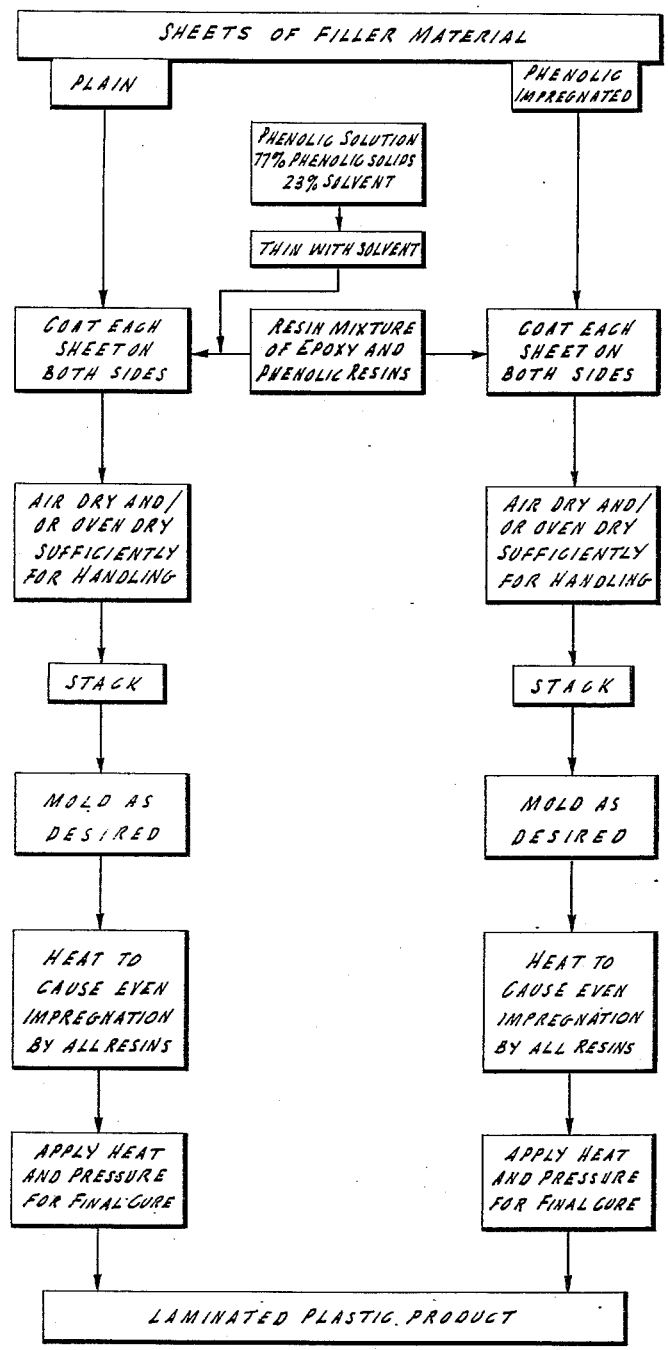

2,810,674

RESIN LAMINATES AND METHOD OF PRODUCING SAME

Joseph V. Madden, Culver City, Calif., assignor to Hughes Aircraft Company, Culver City, Calif., a corporation of Delaware Application October 27, 1954, Serial No. 465,017

3 Claims. (Cl. 154—140)

This invention relates to resin laminates, and more particularly to methods of producing improved phenolic resin laminates. This application is a continuation-in-part of application Number 306,123, entitled, "Resin Laminates and Method of Producing Same," filed August 25, 1952, now abandoned.

Phenolic laminates of the type heretofore known have been produced by impregnating sheets of filler material, such as glass cloth and the like, with a phenolic resin, and subjecting a stack of such phenolic impregnated sheets to predetermined pressures and temperatures until a finished laminate is obtained. The use of such phenolic resin laminates, however, is limited because of their relatively low flexural strength which generally ranges below 60,000 lbs. per square inch, and their tendency to blister and/or post form (deform) at temperatures of the order of 400° F. to 500° F.

It is an object of this invention to provide a method of producing an improved phenolic resin type laminate which does not blister and/or post-form easily and which exhibits a higher flexural strength than laminates manufactured heretofore.

It is another object of this invention to provide a method of improving phenolic type laminates in order to obtain a better product than has been possible heretofore.

In one embodiment of the present invention, a resin mixture is made which comprises a phenol aldehyde resin and an epoxy type resin substantially in the ratio 1:4. An epoxy hardener, a plasticizer and an acid are added to the mixture to insure uniform curing of portions of the epoxy resin and to insure that both resins will flow evenly and cure at substantially the same rate. Sheets of filler material are coated on each side with this solution; they are then stacked and heated to insure even impregnation by the resins and even curing of both types of resin to a predetermined degree. Subsequently, the stacked sheets are cured to a final desired degree of cure. The resulting laminate exhibits a flexural strength in excess of 100,000 p. s. i. (pounds per square inch) and does not blister and/or post-form at temperatures below 600° F.

The novel features which are believed to be characteristic of the invention, both as to its organization and method of operation, together with further objects and advantages thereof, will be better understood from the following description considered in connection with the accompanying drawing, in which the single figure is a flow diagram.

Referring to the drawing, two procedures may be followed for obtaining an improved phenolic type laminate, depending upon whether sheets of filler material to be made into layers of the laminate are initially untreated, or plain, or are impregnated with a phenolic resin. The treatment of phenolic impregnated sheets, shown at the right-hand side of the flow diagram, will be considered first.

Each of a number of phenolic impregnated sheets of suitable filler material, which for example may be a fabric such as glass cloth, is coated on both sides with a resin mixture. The resin mixture, which is indicated at the center of the flow diagram, is prepared in the following manner:

A phenolic resin, preferably of the type with which the sheets of filler material are impregnated, and typical of which is a resin made by reaction of phenol with an aldehyde, is mixed with an epoxy type resin. A suitable epoxy type resin is one which is obtained by reacting epichlorhydrin and bis-phenol A. An epoxy hardener taken from the group of amines, such as ethylenediamine or aminoethyl ethanolamine, is combined with the resin mixture in sufficient quantity to provide curing between individual portions of the epoxy resin. A plasticizer, which may be a vegetable oil, of which linseed oil and castor oil are examples, is next added to the mixture to provide substantially even flow for both the epoxy and phenolic resins. Following this step, a strong inorganic acid, such as concentrated hydrochloric acid, sulphuric acid or phosphoric acid, is added to or admixed to the resin mixture to effect substantially equal curing, or "co-cure," of the epoxy resin and the phenolic resin. A final ingredient of the mixture is a suitable solvent, such as acetone, for thinning the mixture as desired for painting, dipping, or spraying.

As above mentioned, each of the phenolic impregnated sheets of filler material is coated on both sides with the epoxy-phenol resin mixture. After the resin coating has dried sufficiently so that the sheets can be conveniently handled, as by air drying and/or oven drying in the manner indicated on the right-hand side of the drawing, the sheets are stacked together.

If the stacked sheets are to be molded, they may be formed in a mold of a desired configuration.

The stacked sheets are next heated to a temperature sufficient to cause all the resins—the epoxy and phenolic resins of the coating mixture, and the phenolic resins with which the filler material was initially impregnated—to thoroughly and evenly impregnate the filler material. Finally, the resins are cured to a desired extent by any suitable means, such as by the simultaneous application of heat and pressure as required to effect such curing.

It may be desired that the heating and curing of the stacked sheets of filler material as above mentioned be controlled so as to render the resins substantially void-free. A preferred method for so controlling the heating and curing is the so-called "void-free" process, described and claimed in U. S. Patent No. 2,683,105, entitled, "Method of Producing Plastic Laminates," C. T. Forbes et al., issued July 6, 1954. Briefly, as described in such patent, the stack of coated sheets undergoes a "presqueeze" period which involves heating the stack at a predetermined temperature, and under substantially atmospheric pressure, until the resins are past a minimum viscosity point, i. e., are in a liquid state, and substantially all volatile matter has escaped from the resins. After the volatile matter has escaped, and before the gelation point of the resins is reached, a predetermined pressure above atmospheric pressure is applied to the stack, while maintaining it at the same temperature, to cure the resins to a desired intermediate extent. The resins are given a final cure by heating the stack at a suitable temperature and at substantially atmospheric pressure until the desired degree of final cure is achieved. By processing the coated sheets in this manner, a laminate results that is substantially void-free, that is, it is substantially impervious to gases.

To process sheets of filler material impregnated with a phenol-aldehyde resin, a resin mixture prepared as above described may contain, for each 200 grams of epoxy resin:

25.0–75.0 g. (grams) phenol aldehyde resin
50.0–90.0 g. epoxy hardener
0.55–1.95 g. plasticizer
0.9–3.2 g. acid The solvent may be varied as required for the particular coating process. For example, 50.0–85.0 g. of solvent would be sufficient for painting the sheets, and this amount may be increased 2.5 times for dip impregnation and 25 to 40 times for spray coating.

If the sheets of filler material to be processed in accordance with the present invention are initially untreated, or plain, as shown on the left-hand side of the diagram, the following ranges of ingredients, for each 200 g. epoxy resin, may be employed:

60.0–85.0 g. phenol aldehyde resin
50.0–90.0 g. epoxy hardener
0.55–1.95 g. plasticizer
1.95–3.25 g. acid
75.0–90.0 g. solvent (for painting)

Again the amounts of solvent may be increased as explained above for dip impregnation and spray coating.

In the above groupings of ingredients, the approximate weight proportions are as follows: the phenol aldehyde resin comprises from 10% to 30% by weight of the two resins; the weight of the hardener is from 25% to 50% of the weight of the epoxy resin; the weight of the plasticizer is from .28% to 1% of the weight of the epoxy resin; and the weight of the acid is from 0.45% to 1.63% of the weight of the epoxy resin. It will be apparent that the small amounts of the plasticizer and acid are not critical; those ingredients are merely added in sufficient amounts to effect substantially even flow and even curing of both the resins.

Phenolic laminates treated in accordance with this invention have flexural strengths greatly in excess of phenolic laminates produced by prior art processes. For example, a laminate of three sheets of phenolic impregnated glass cloth, each approximately 0.010 inch thick, was coated with the following resin mixture, for each 200 g. epoxy resin:

50 g. phenol aldehyde resin
60 g. epoxy hardener (ethylenediamine)
1 ml. plasticizer (linseed oil)
1.5 ml. concentrated hydrochloric acid
75 g. solvent (acetone)

and cured by the void-free process of the above-mentioned patent, was found to exhibit a flexural strength of approximately 110,000 p. s. i., which approaches the flexural strength of aluminum. Further, the laminate was found to resist blistering and/or post-forming at temperatures below 600° F.

A similar laminate, made from sheets of unimpregnated glass cloth, was achieved by the use of a coating solution which contained, for each 200 g. epoxy resin:

67.0 g. phenol aldehyde resin
60.0 g. epoxy hardener (ethylenediamine)
1.3 g. plasticizer (linseed oil)
2.2 g. concentrated hydrochloric acid
80.0 g. solvent (acetone)

What is claimed is:

1. The method of preparing a plastic laminate from a plurality of sheets of filler material comprising: preparing a resin mixture of epoxy and phenol aldehyde resins wherein the phenol aldehyde resin comprises from 10% to 30% by weight of the total resin mixture, adding an epoxy hardening amine which by weight is within 25% to 50% of the weight of the epoxy resin, adding enough of a vegetable oil plasticizer to effect substantially even flow of both said resins, adding an inorganic acid in an amount to effect substantially equal curing of both resins, and adding a solvent to thin the mixture to a consistency for coating said sheets, coating said sheets with the thinned mixture, stacking said coated sheets, heating said coated and stacked sheets to effect even impregnation thereof by both the epoxy and phenol aldehyde resins, and curing said heated stacks by the void-free process.

2. The method of producing a plastic laminate from a plurality of plain sheets of filler material, said method comprising the steps of preparing a mixture of epoxy and phenol aldehyde resins wherein the phenol aldehyde resin comprises from 20% to 30% by weight of the combined resins, adding an epoxy hardening amine which by weight is within 25% to 50% of the weight of the epoxy resin, adding a vegetable oil plasticizer in an amount from 0.28% to 1.0% of the weight of the epoxy resin to effect even flow of both resins, adding a concentrated inorganic acid which by weight is within 0.45% to 1.6% of the weight of the epoxy resin, and adding a thinning solvent to obtain a solution of a consistency suitable for coating said sheets, coating said sheets with said solution, stacking said coated sheets, heating said stacked and coated sheets to effect even impregnation thereof by both said resins, and curing said heated stack under pressure and heat until a final cure of the resins is achieved.

3. The method of producing a plastic laminate from a plurality of sheets of filler material impregnated with a phenol aldehyde resin, said method comprising the steps of preparing a mixture of epoxy and phenol aldehyde resins wherein said phenol aldehyde resin comprises from 10% to 30% by weight of the combined resins, adding an epoxy hardening amine which by weight is within 25% to 50% of the weight of the epoxy resin, adding a vegetable oil plasticizer which by weight is within 0.28% to 1.0% of the weight of the epoxy resin, adding a concentrated inorganic acid which by weight is within 1.0% to 1.63% of the weight of the epoxy resin, and adding a thinning solvent to the mixture to obtain a solution of a consistency suitable for coating said sheets, coating said sheets with said solution, stacking said coated sheets, heating said stacked sheets, and to effect even impregnation thereof by the epoxy and phenol aldehyde resins, and post-curing said heated and impregnated stack by the void-free process.

References Cited in the file of this patent

UNITED STATES PATENTS

| | | |
|---|---|---|
| 2,510,885 | Greenlee | June 6, 1950 |
| 2,512,996 | Bixler | June 27, 1950 |
| 2,521,911 | Greenlee | Sept. 12, 1950 |
| 2,521,912 | Greenlee | Sept. 12, 1950 |

OTHER REFERENCES

Modern Plastics, "Epoxy resins in glass cloth laminates," November 1950, pages 113–114, 116, 118, 120 and 122.